United States Patent
Morse et al.

(10) Patent No.: US 6,626,677 B2
(45) Date of Patent: Sep. 30, 2003

(54) METHOD FOR ENHANCING WORK RELATED CREATIVE THINKING AND TEAM BUILDING SKILLS

(76) Inventors: Stuart H. Morse, 401 Laurey La., Chesterfield, MO (US) 63005; Stacey A. Morse, 401 Laurey La., Chesterfield, MO (US) 63005

( * ) Notice: Subject to any disclaimer, the term of this patent is extended or adjusted under 35 U.S.C. 154(b) by 109 days.

(21) Appl. No.: 09/757,986

(22) Filed: Jan. 10, 2001

(65) Prior Publication Data

US 2002/0090598 A1 Jul. 11, 2002

(51) Int. Cl.[7] .............................................. G09B 19/00
(52) U.S. Cl. ........................ 434/237; 434/107; 434/236
(58) Field of Search ................................ 434/236, 237, 434/107, 128, 129, 219; 705/10, 11

(56) References Cited

U.S. PATENT DOCUMENTS 5,762,503 A  6/1998  Hoo et al.
6,079,984 A  6/2000  Torres et al.

OTHER PUBLICATIONS

Corporage Games Creative Team Building Events, Oct. 13, 1999.*
Team Sandtastic: Professional Sand Sculpture, Jan. 31, 2000.*

* cited by examiner

*Primary Examiner*—Derris H. Banks
*Assistant Examiner*—Kurt Fernstrom
(74) *Attorney, Agent, or Firm*—Polster, Lieder, Woodruff & Lucchesi, L.C.

(57) ABSTRACT

A method of enhancing work related leadership, communication and creative skills is disclosed. The method of the present invention comprises formulation of an art related project having a presentation component including dissemination of goals and objectives, an exercise component including written, directed questions to participants and the creation of fine art pieces by participants, and a conclusion component wherein participants critique the fine art pieces and discuss the manner in which the goals and objectives were accomplished.

5 Claims, 5 Drawing Sheets

71 ———— 3 fin designs, 3 sheets each in varying sizes.

72 ———— 3 design elements

73 ———— 8 - 3/16" wooden dowel rods: varying in length from 36" to 8".

74 ———— 8 - 1/4" fishing swivels

75 ———— 5 to 8 - 1/4" flat washers

76 ———— 12" of 3/16" clear tubing

77 ———— one table stand

METHOD FOR ENHANCING WORK RELATED CREATIVE THINKING AND TEAM BUILDING SKILLS

CROSS REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

Corporations and other large institutions have historically attempted enable their employees and members to think creatively and innovatively, to be able to communicate ideas, accept change and have good team skills. In the past consultants have used different forms and exercises to enhance these attributes. However, these exercises have typically either been purely psychological or sociological encounter sessions, or game-like activities employing a physical challenge component.

Examples of game-like physical challenge are known. For example, a method of performing a physically challenging obstacle course to build confidence and communication skills is disclosed in U.S. Pat. No. 5,762,503, issued on Jun. 9, 1998 to Hoo et al. In the disclosure of that patent, an obstacle course wherein a team must think quickly, act together as a single unit and assist each other through difficult sections of the course. Obstacle courses also draw upon the team's creativity when attempting to negotiate particularly difficult sections, such as high walls or moats. By completing such a course, participants often experience a strong sense of accomplishment and a heightened sense of confidence which may translate to the work environment in their willingness to take on and solve difficult problems as a team. Importantly, these exercises also identify those individuals who have difficulty working in a team environment. The system employed therein comprises a system of electronic components manipulated by a control engine for use either as a team building or management training exercise or as a game. The system generally includes a plurality of monitors, such as low-power lasers, proximity detectors, noise detectors, infrared receivers, weight detectors or other like instruments configured and arranged in a given space as an obstacle course. Each monitor includes a corresponding sensor for notifying the control engine whenever the monitor associated with that sensor has been triggered, e.g., when a particular laser beam is interrupted or when a particular proximity detector senses a nearby object. The control engine dynamically processes these events to tabulate and manifest the triggering of the monitors.

In U.S. Pat. No. 6,079,984, issued on Jun. 27, 2000 to Torres et al., another physical activity related team building educational system employing portable props such as planks, ropes and the like for construction of a challenging course. This course forms a part of what is described as adventure-based education, often referred to as a "ropes course", and is typically a set of events or problem-solving activities designed to teach team building, trust, problem solving, leadership, and individual initiative and creativity.

The goals in the above mentioned examples are the completion of a physical challenge. However, physical challenges may be threatening to some individuals, or worse may not be possible due to an individuals physical disability.

Another type of known team building exercise includes the sharing of personal, often intimate details of the individual members' lives with a group of work associates. These exercises can be difficult for some individuals, due to a reticence to divulge these intimate details, or worse can be damaging to an individual professionally or socially.

There is therefore a need for a team building method that does not favor the physically strong, and does not involve the sharing of intimate life details with work acquaintances.

BRIEF SUMMARY OF THE INVENTION

An object of the present invention is to broaden creative thinking and problem-solving.

A further object of the present invention is to improve individual and team innovation.

Another object of the present invention is to promote corporate culture.

Another object of the present invention is to promote-exploration of challenges through risk taking.

A further object of the present invention is to enhance communication skills.

Another object of the present invention is to celebrate personal and group creativity.

Other objects and features will be in part apparent and in part pointed out hereinafter Briefly stated the present invention uses the fine art creative process to enhance creative thinking, innovation, communication, teamwork all tied to a corporation's or institution's visions and objectives. In accordance with the present invention provision for fine arts centered creativity building projects are disclosed. While the detailed structure of each project may be modified to create unique experiences, a general format and several examples are disclosed. In accordance with the present invention, the project comprises at least one presentation component that introduces the art medium or media to be employed, as well as providing objectives and goals to be achieved in the project, at least one exercise component in which participants execute a fine art project and answer a set of questions directed toward facilitating the goals and objectives stated in the presentation, and at least one conclusion component in which participants critique the artwork created in the exercise, and discuss their answers to the written questions provided in the exercise.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The present invention relates to provision of goods and services intended to encourage leadership, communication and creative thinking skills through the use of fine art media.

For purposes of this disclosure, the term "thinking outside of the box" means thinking in a non-linear (lateral), unconventional, global (as opposed to specific), inventive or non-traditional way. The term "studio" means an organization or individual who designs and facilitates the presentations and exercises that form the programs of the present invention. The terms "staff," "instructor," and "assistant" mean employees or agents or representatives of a studio who are involved in implementing or enabling or providing instruction, support, or guidance in and concerning a program. The term "staff" encompasses both "instructors" and "assistants." The term "facility" means a defined area in which the programs of the present invention will transpire. A "facility" may be a defined area within a sponsor's legal property interest (either within a structure such as a building or outside of a structure), or a building in which the studio has a property interest, or an area under the supervision and control of the studio (either within a structure such as a building or outside of a structure), or a public or private area in which neither the sponsor nor the studio has a property interest, but in which the studio or sponsor has a right or permission by one who does have a property interest to utilize for the purpose of conduction or taking part in a program of the present invention.

In the practice of the present invention, a studio provides a facility for meeting with participants. The facility may be within a building, or in a defined area outdoors. The facility should be large enough to accommodate the number of participants engaged in the program designed by the studio. The facility includes stations for designating areas in which groups formed by the participants congregate. Preferably, the stations comprise tables, upon which various media are placed for use by the participants. The manner in which the participants congregate and the media employed for use in exercises are described in the proceeding examples.

The studio communicates with a corporate sponsor or other institutional sponsor or client, who provides the studio with general objectives to be met by the client's participating members. Thus, the participants are affiliated with the client or sponsor. These objectives may include increasing participants' leadership ability, enhancing participants' communication skills, encouraging participants' ability to work together, facilitating participants' ability to think outside of the box, providing participants with a mode of relaxation, allow new employees to feel integrated into a corporation, promote motivation and reinvigoration of long-time employees, to further an institution's vision or mission, to promote enthusiasm and insight into a corporation's products or services, or other useful workplace skills.

Participants are segregated into groups, and at least two groups are formed with at least three participants in each group. Within the group, each participant has a defined role or function, which is predetermined by the studio.

The studio then designs a program that is intended to meet the client's goals and objectives. The program comprises an initial presentation, an exercise presentation, an exercise, and a final presentation. The initial presentation introduces the participants to the fine art processes that will be executed during the exercise. The exercise presentation explains the specific methods to be used during the exercise, and introduces a series of goals, objectives, and questions to the participants to resolve during the exercise. The exercise portion comprises execution by the participants of a task that produces tangible artwork, and focused instruction by an instructor provided by the studio. The final presentation provides a summary, an instructor's critique of the artwork produced, the participants' critique of the artwork produced by the participants, and a dialog among participants regarding the extent that the goals and objectives were accomplished, and the manner in which the goals and objectives were accomplished.

The following examples illustrate embodiments of the present invention, and are not intended to be limiting in scope.

EXAMPLE I

Digital Photo Project

Using the fine art creative process in the medium of photography participants use an optical capturing device, preferably digital, to collect and create images. The layout of the work area is described in FIG. 4. The exercise is described in the flow chart form in FIG. 1 First, shown generally at 1, preliminary discussions with the client determine the goals and objectives the client is interested in achieving through the exercise. A program is then built using the photographic fine art exercise 2.

Figure 1:
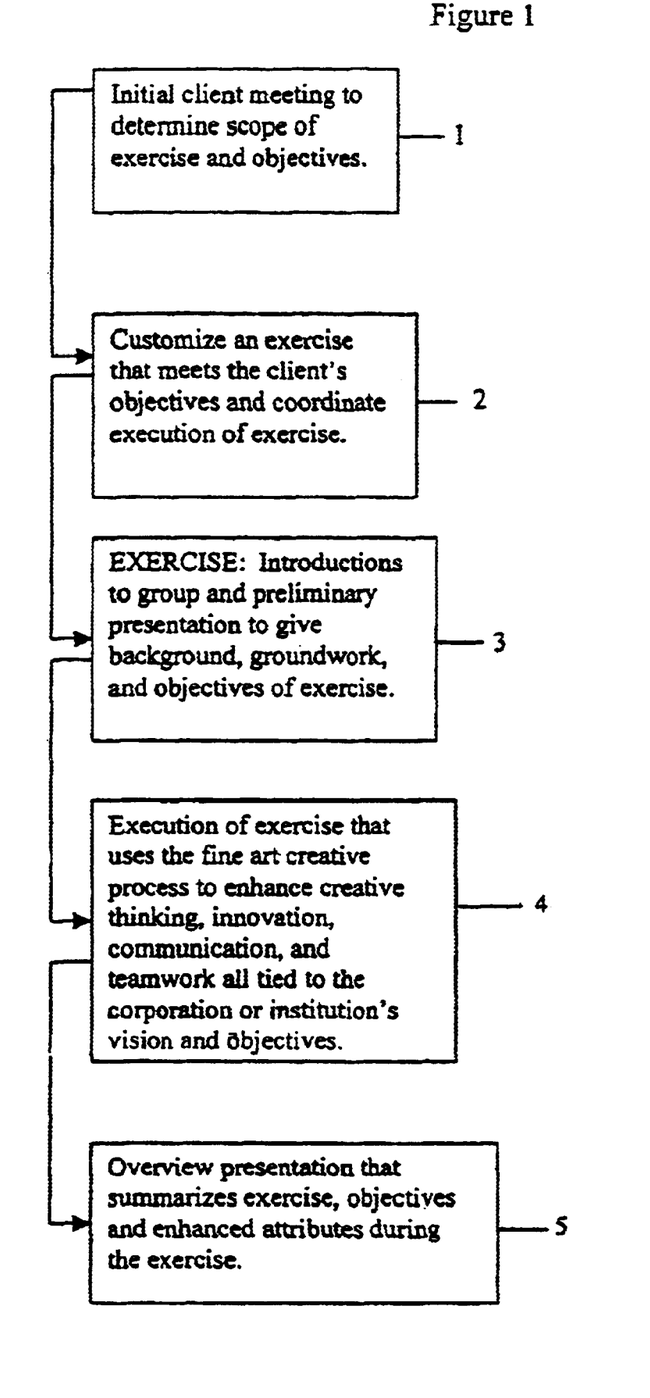
FIG. 1 is a flow chart of a photographic exercise embodiment of the method of the present invention.

The program 2 is put together comprising a presentation and lecture, the creative fine art exercise, a final exercise summary and presentation of artwork. The presentation is preferably an electronic presentation, and more preferably a presentation using POWERPOINT® presentation software, available from MICROSOFT® Corporation. The presentation may be general in format, and used repeatedly for various clients, or it may be specifically designed for use with a particular client.

At the exercise presentation 3, the POWERPOINT presentation introduces the creative process that will be involved in the ensuing exercise, and explains its foundation and attributes. It explains that the creative process involves risk taking, creativity, innovation and imagination. The presentation then describes the photographic creative process using examples of both black and white and color photography. Composition, design, use of light and contrast are all presented in the lecture. Photographs shown in the presentation are discussed openly with the group to heighten awareness and sensitivity to the meaning of the artwork and the attributes of the artwork that allow it to communicate those attributes. This process opens up dialogue in the group, which will be needed during the exercise to communicate with team members. The full exercise 3 is then introduced and described and examples are presented.

The disciplines and makeup of the individual teams are discussed and the group is then divided into the teams, for example teams of 5 people.

Participants move to their team's designated tables. In the illustrative embodiment of FIG. 4, there are six teams, and each team occupies a station. Therefore, team one occupies station 51, team two occupies station 52, team three occupies station 53, team four occupies station 54, team five occupies station 55, and team six occupies station 56.

Figure 4:
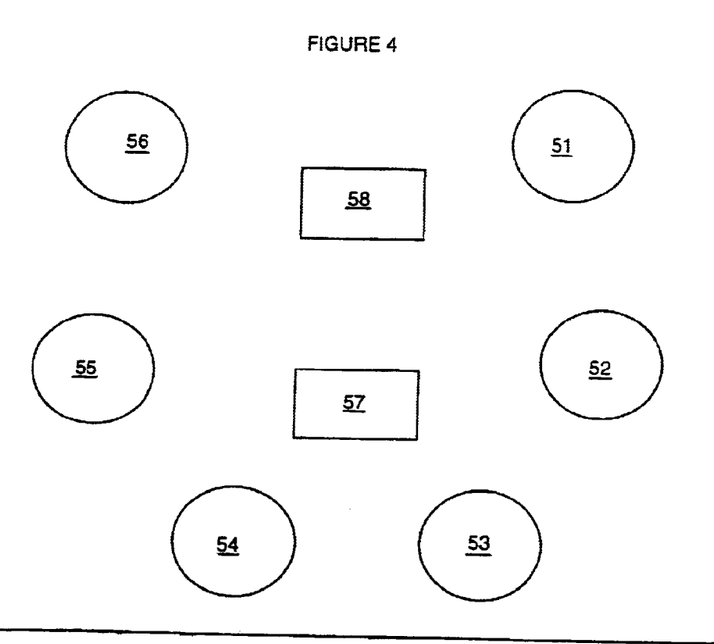
FIG. 4 is a schematic diagram of an exercise layout of the present invention.

Each member of the team is given a number between one and five, in this example of five members per team. Of course, if different numbers are selected to comprise a team, then each member is given a number corresponding to the total number of team members. The numbers given to each team member correspond to a particular task to be undertaken by that member. The participants all move to a station provided to correspond to the assigned number to receive instruction in their particular discipline and responsibilities to the team. Therefore, each station in this example will have a number between one and five, inclusive.

Each member assigned the number one are camera operators and go to station one 51 to learn camera operations. Each team receives one digital camera, preferably with one memory card, which is not installed. An instructor shows this group the basic operations of the digital camera, for example, how to turn the camera on and off, viewing options, menu access, image control, exposure control, reviewing images and the like.

These members (that is, members who have received the number one) are to answer questions on the successful use of the camera and how to be the authority within the team regarding the camera equipment. Examples of questions to be answered are as follows: How would you explain the basic mechanics of the camera? What are the four most important tips you will give the operator? How would you divide the operations of the camera up into an easy package to comprehend? How do you plan to share this camera with your team members in an orderly fashion to make the exercise complete?

Each team member number two goes to station two 52 and is provided with a radio with a communications packet describing the rules of communication. These members are to sit and read this packet and oversee the rules of communication of their respective teams. These number two members are also provided with examples of good communication techniques when working in a group.

The number two members will use their radios to contact an instructor when a category of images is complete and will be the sole communicator to the instructor on the open radio network.

Individually they are to give a written answer to a set of questions and discuss topics on communication as stated in their packets. Examples of questions pertaining to communication are as follows: what is a good way to communicate an idea? How would you approach getting someone else to change their idea? What aspects of a good question are needed for a good answer? What will be a determining factor for use of the radios to talk to an instructor?

Each team member number three, attends station three 53 and is given photography books and a packet that addresses composition, design, and statements concerning photography. Team members number three are the creative element members of the team.

Individually, they are to give a written answer to a set of questions and as a group they are to discuss topics on photographic creative elements as stated in their packets. Examples of questions regarding creative elements pertaining to photography are the following: What are elements that make up a strong composition? How can light be used in a photograph? How can angle of view be important and used? What is the difference between black and white and color and how can it be used? How can scale play a part in a photograph? What values can be communicated through a photograph?

Each team member number four, is sent to station four 54 and is given the goals and objectives of the imagery to be collected by their team. Team members number four are the goals and objectives team members. The team is given a packet that contains a list of five images to collect and guidelines/objectives for each image. Examples of the rules to be used in the collection are as follows: Each member will photograph two photographs to represent their image choices. Each team member must make a conscious creative decision and be able to substantiate this to the other team members.

Examples of the goals and objectives for the collection of images would be the following: The goal is to see, interpret and communicate your business in a new way. The objective is to capture the following five images and make team selections in the allotted time. First image is to capture a something about the environment that you work in. The second is to photograph some of the people who work at your company. The third is to photograph your companies product or service. The fourth is to photograph something special to you at the company. The fifth is to photograph the uniqueness of the company.

Each team member must photograph two choices for each category provided in the list given to each team member number four. In this example of five team members, therefore, each team will have ten images from which to select. The team will then view their choices at a viewing station monitor 57. They will then critique and select two final images to represent the team.

Each team member number four will be responsible for recording and keeping track of the teams' choices. Team member number four is to individually give a written answer to what is believed to be appropriate for the team to photograph and to represent these criteria and goals on the list.

As a group each team is to discuss topics on what type of photographs might be taken to meet their list of images. For example, a first image is to capture something about the environment that the team member works in. The second is to photograph some of the people who work at the team member's company. The third is to photograph the team member's company product or service. The fourth is to photograph something special to the team member at the company. The fifth is to photograph the uniqueness of the company.

Examples of lists a team might make would be the following: First image to capture something special about the environment a team may list a photograph of plants in the office, architectural features, light pouring in through a window, the scenery out of a window, the bustle of people in the office or factory, and the like.

Each team member number five goes to station five 55 and is given a document representing the goals and objectives of the exercise. Team member number five is the team coordinator and time-keeper. Team member five ensures that the individual knowledge each member is responsible for is used by the whole group. Team member number five is also invested with the final vote on image selection in case of a tie. Team member number five must make sure their team meets the goals in the allotted time. Team member five is given a packet on elements of team leaders and coordinators. The leadership and coordinator document would contain the following: Leaders keep the goals and objective foremost in their mind. Leaders must see the value of every team member and must strive to use each team member's assignment to strengthen the whole team. Leaders must be good communicators and listeners. Listen to how people communicate and then communicate with team members in the style they are comfortable with. Coordinators use all their resources in a fine balance and mix to be successful. Coordinators confront issues immediately to allow all team members to focus on the goals and objectives.

Individually, each team member number five is to give a written answer to a set of questions and as a group the team is to discuss topics on coordination and leadership as stated in their packets. The following are examples of questions on coordination and leadership: How will you keep your team focused on the goals and objectives of the exercise? Describe your leadership style and how you will use it to your benefit. How will you coordinate the tasks of taking this many photographs with your team? How will you substantiate your decisions? How will you maintain your leadership role when final deciding image votes take place?

Each team is then reassembled at their respective initial station tables: Team one assembles at station 51, team two one assembles at station 52, team three assembles at station 53, team four assembles at station 54, and team five one assembles at station 55.

Referring now to FIG. 1, The teams are then given final instructions as a group and sent out to execute the exercise 4. Instructors monitor the radio network. When called instructors keep track of which team is calling and answer questions.

When a team has met its first category the instructor meets them at a viewing station and assists them with knowledge and critiques their choices. The team then gives the instructor its disk from the camera and the instructor provides the team with a blank disk for their next category.

The images on the disk are immediately down loaded into a suitable display device, such as a laptop at the image station 58. The image is manipulated by a staff member and used in a POWERPOINT presentation for the summary lecture to be given at the end of the exercise 5.

Disks are erased and cycled back to the teams through the instructors.

When each team has completed all categories on their respective lists, the teams return to the assigned station tables and submit their final disks.

Participants then take a break, for example for ten minutes.

During the break the instructors finalize the images on the laptops and prepare the POWERPOINT presentation with each team's images related to the categories. The instructors also fill their own categories such as, for example, best use of light, best use of composition, and the like.

Using printers attached to computers, preferably portable printers hooked to the laptop computers, The staff begins printing the final team images for team members to take with them after the exercise. These images are matted and framed at the end of the exercise.

When teams return from the break, they sit at their assigned tables and individually return to their questions they had answered earlier and are given a chance to amend their first answer, for example in a new column of the question and answer document.

Each team member shares their respective answers, information, and experience with the other team members. Team members provide suggestions to each other. Each team prepares a collaborative statement that reflects the previously stated topics, goals and objectives and of how the team as a whole feels these goals and objectives were achieved in the exercise through the processes of creative thinking, teamwork, leadership, communication, and thinking outside of the box.

The POWERPOINT presentation with the teams images and summary are given to the whole group. Images taken during the exercise are used in the presentation. After all images have been presented, the group votes as a whole on the most successful images. The teams then present their statement and answer questions regarding the process. A summary is then given in POWERPOINT in conclusion 5.

The participants are then given printed and framed images as they leave the exercise of the successful images produced during the exercise. The finished pieces can then be displayed as a reminder of the goals and objectives of the exercise. This program is intended to encourage the broadening of creative thinking, innovation, communication, flexibility, teamwork and "thinking outside the box."

EXAMPLE II

Mobile Project

Using the fine art creative process in the medium of sculpture participants use materials to design and create mobiles. The layout of the work area is described in FIG. 5. The exercise is described in flow chart form in FIG. 2.

Figure 2:
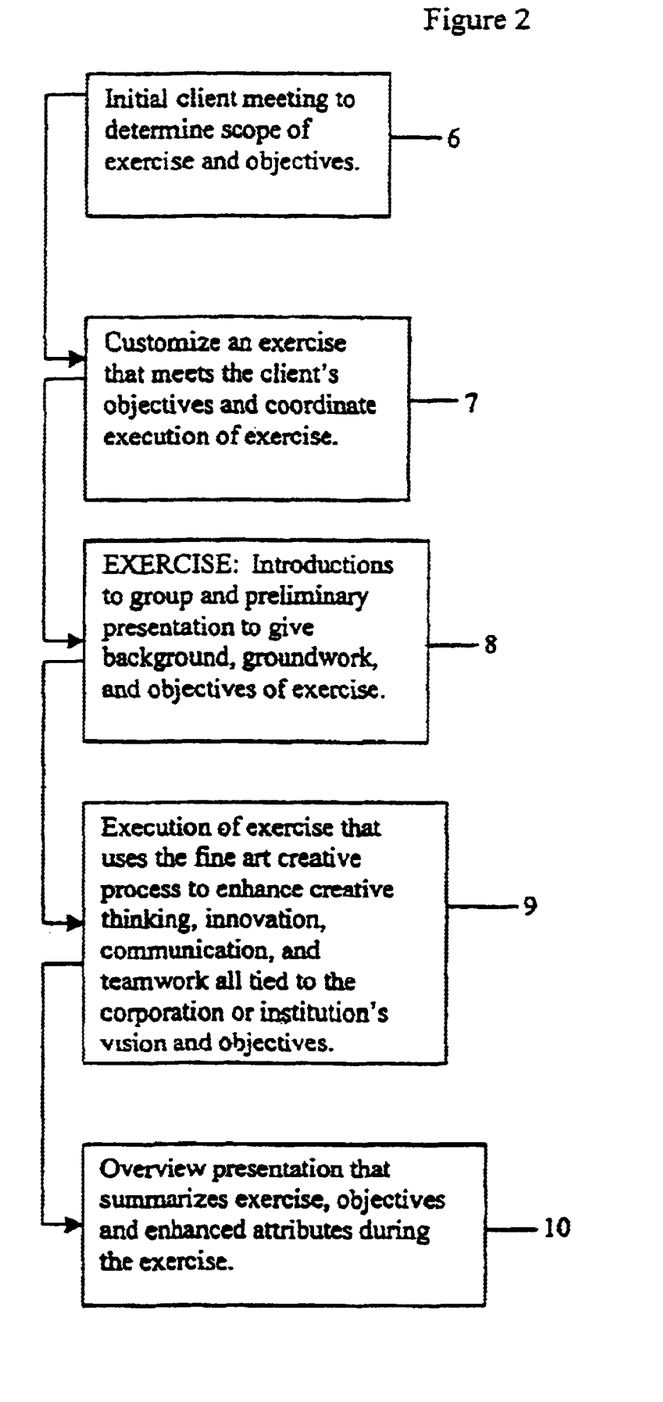
FIG. 2 is a flow chart of a mobile building exercise embodiment of the method of the present invention.

First, preliminary discussions with client determine the goals and objectives the client is interested in achieving through the exercise. A program is then designed using the mobile fine art exercise 6.

The program is put together comprising an electronic presentation, preferably in POWERPOINT, and lecture, the creative fine art exercise, a final exercise summary and presentation of artwork 7.

At the exercise presentation 8, the POWERPOINT presentation introduces the creative process that will be involved in the ensuing exercise, and explains its foundation and attributes. It explains that the creative process involves risk taking, creativity, innovation and imagination.

The group is divided into teams of; for example, five members. Members move to their team's respective designated tables. In the illustrative embodiment (FIG. 5) there are six teams. Team one assembles at station 61, team two assembles at station 62, team three assembles at station 63, team four assembles at station 64, team five assembles at station 65, and team six assembles at station 66.

Each member of the team is given a number from one to five, inclusive, for this illustrative example.

Each team is provided with a packet, which contains a document for each team member, mobile fin designs and design criteria for the fins.

Each team member is to silently write the answer to the questions on their sheet. Examples of the questions are as follows: What makes a good leader? What makes a good team? Define the process of creativity as a team. When is creativity complete? How would you define the different roles in a team?

Figure 6:
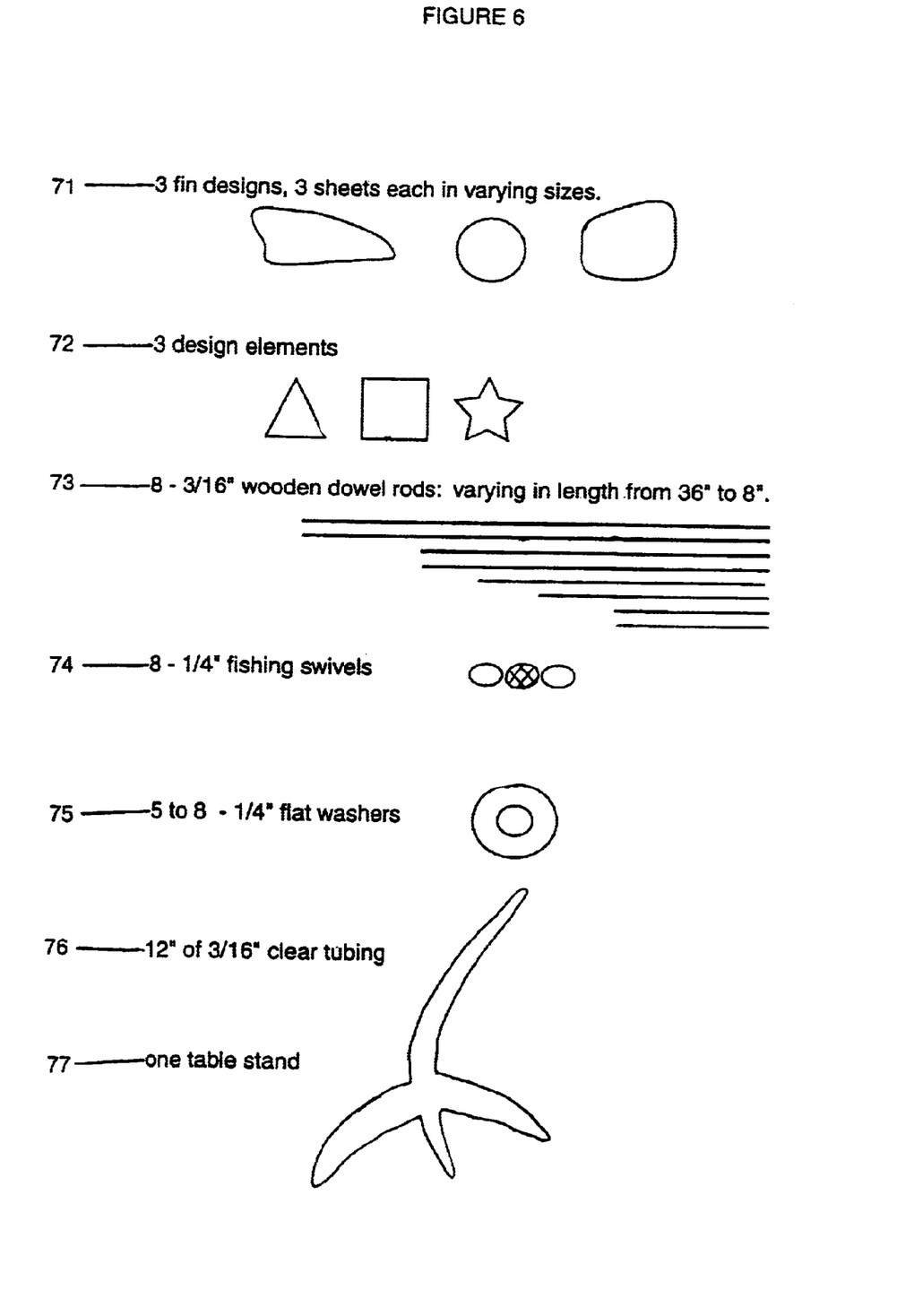
FIG. 6 is a schematic diagram of representative components used in the mobile building exercise embodiment of FIG. 2.

Referring now to FIG. 6, each team is given the following list of supplies: three sheets each of three fin designs 71, a sheet of three design elements 72, three sets of markers, scissors, clear tape, pencils, and drawing paper (not shown).

Team members are then asked to pick two arbitrarily selected fins 71 of the individual's choice out of the sheets that are provided. Members then cut out the fins 71, and begin to create designs on the fin shapes, using markers.

Members are to design using the one or more of the design shapes given in their packet of materials. Members are to design only one side of the fin. When completed, members pass their fin to the team member to their left. This team member must reinterpret the fin design on the back. After all fins have been designed and colored a presentation is given.

The second presentation is preferably presented with POWERPOINT. This presentation addresses the second phase of the mobile type of sculpture. This presentation then describes the sculpture creative process using examples of famous mobiles, for example mobiles designed by Alexander Calder. Composition, design, weight and form are all presented in a lecture. Sculptures shown in the presentation are discussed with the group to heighten awareness and sensitivity to the meaning of the artwork and the attributes of the artwork that allow it to communicate those attributes. This process facilitates a dialogue in the group, which is required during the exercise to communicate with team members. The full exercise is then introduced and described and examples are presented.

Teams are next presented with a set of mobile materials comprising the following: eight-3/16" dowel rods 73 of varying lengths from eight to thirty-six inches, eight swivels 74, each five to eight and one quarter inches long, flat washers 75, twelve inches of 3/16" clear rubber tubing 76, and a table mobile stand 77. It is to be understood that various lengths of dowel rods, swivels, washers and clear rubber tubing could be effectively used in the practice of this invention, and that the sizes represented in this example are merely illustrative.

A first task is given for each team member to individually produce a design solution that represents the most creative and artistic use of those materials.

A POWERPOINT presentation displays and cycles images of mobiles to provide participants with ideas and to study.

Each team then collectively decides on the design within the team that is felt to be the most creative representation of a mobile. All of the team members commit to the one selected design and begin the process of executing and completing the mobile.

After a period of time, for example fifteen minutes into the exercise, a random number between one and five is chosen by an instructor, and that number of team member is asked to move to the next team clockwise around the room. This "change" element is discussed and explained as the new team member must become part of a new team and its goals, objectives, and direction.

Instructors move around the room assisting teams by interjection of questions to spawn or solidify a creative direction. Examples of questions would be the following: Is the goal of the mobile being met? Do you feel your design has addressed all the issues you are encountering? How does the team feel about the direction of the design?

Different topics of design are addressed through the process by the instructors using a display, for example flip charts or dry erase boards.

When mobiles are completed instructors help to address fine tuning issues of the sculptures, helping the teams to self critique their pieces. Examples of questions asked by the instructors would be the following: Does the mobile move with the right amount of freedom? Does the mobile balance in a way that communicates a theme for the artwork?

Teams are then asked to prepare a statement on their process and piece. Examples of statements are: We found that the creative process of working together was quite a challenge. We overcame some of our initial design conflicts by listening to each team member's input regarding the challenge. We chose this design direction because we wanted to communicate the asymmetrical balance of these two objects. We feel it is successful because of the way the shapes create a simplistic rhythm and energy as they move.

Figure 5:
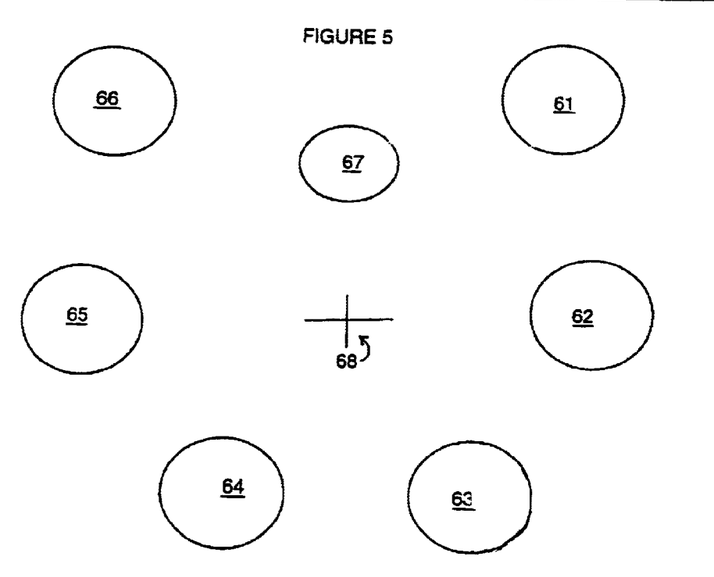
FIG. 5 is a schematic diagram of an exercise layout of the present invention.

Referring now to FIG. 5, teams then present their mobiles, one at a time, at a center table in the room 67.

Instructors and teams ask questions regarding the process. Instructors give a final critique of the process and the final piece. Examples of the final critique would be the following: Does the mobile stand up to our specifications? Is the goal of the mobile being met? The instructor describes how the mobile operates through design composition and mechanics.

During this procedure, a larger mobile stand is assembled in the center of the room by the instructor and an assistant. As teams complete their presentation of their respective mobiles each team balances their respective mobiles on the larger mobile in the center of the room 68.

After all teams have completed their presentations and the larger mobile is finished the teams return to their respective tables.

When teams return to their respective tables, members return to their questions answered earlier and are given a chance to amend their first answer, for example in a new column in the question and answer document.

Each team member shares their respective answers, information, and experience. Team members give insight in how to improve. Examples of the questions are as follows: What makes a good leader? As a team, members discuss what leadership qualities were displayed during the exercise. What makes a good team? Members give input to what they felt makes up a good team after their experience. Define the process creativity as a team. Members collectively discuss how they shared their creativity to achieve the finished mobile. When is creativity complete? Shared thoughts about when art is finished. When was their mobile complete and who decided that it was complete? Did everyone agree upon the completion? Define the different roles in a team.

Members talk about the different roles they felt they played as the exercise went on. Did they feel included and how might that be improved?

Each team prepares a collaborative statement that reflects the previously stated topics, goals and objectives and of how the team as a whole feels these goals and objectives were achieved in the exercise through the processes of creative thinking, teamwork, leadership, communication, and thinking outside of the box.

A POWERPOINT presentation is then presented to summarize the exercise and highlight the goals and objectives. The teams then present their statement and answer questions regarding the process. A summary 10 is then given in POWERPOINT in conclusion.

The participants are then given the mobiles to hang in their work environment. The finished pieces can then be displayed to be a reminder of the goals and objectives of the exercise, as well as to broaden creative thinking, innovation, communication, flexibility, teamwork and "thinking outside the box."

EXAMPLE III

Photography And Sketching Project

Using the fine art creative process in the medium of photography and sketching, participants use an optical capturing device, conventional and digital, to collect and create images. The exercise is described in the flow chart of FIG. 3.

Figure 3:
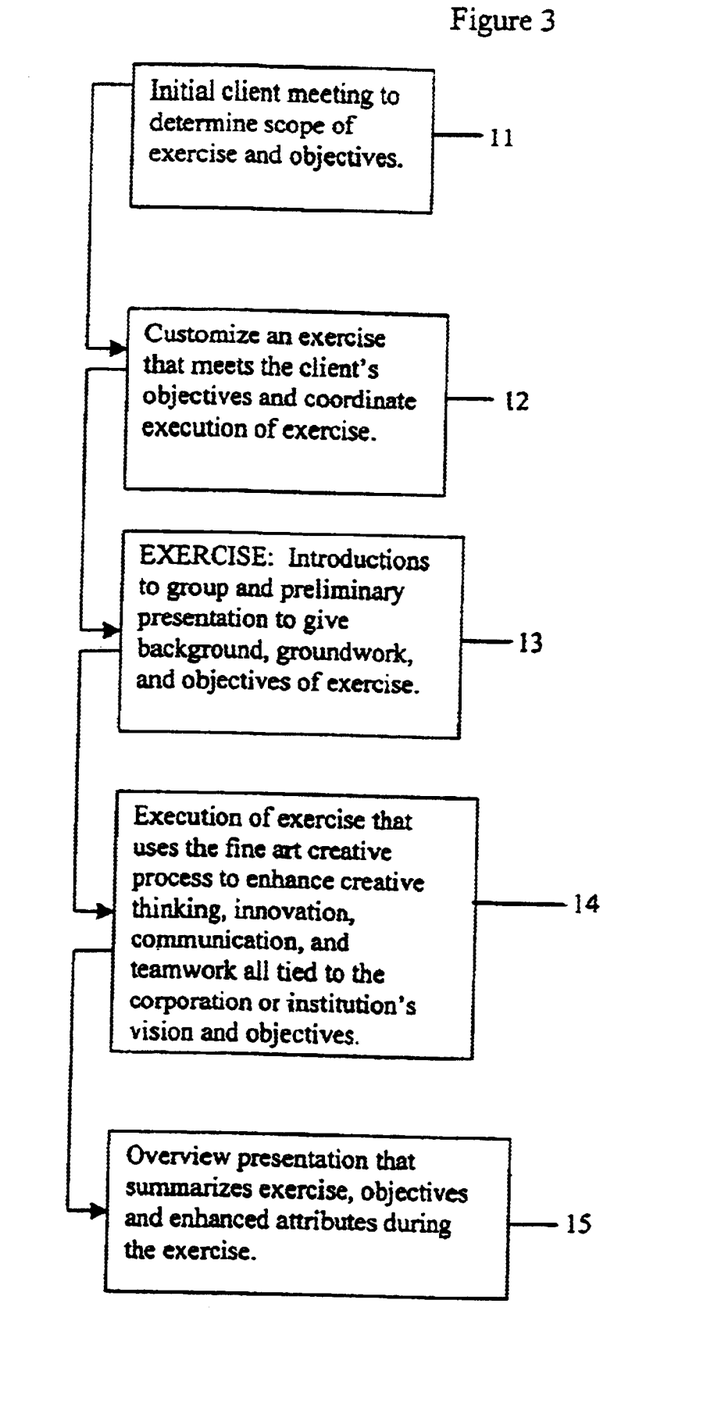
FIG. 3 is a flow chart of a photography and sketching exercise embodiment of the method of the present invention.

A preliminary discussion 11 with the client determines the goals and objectives the client is interested in achieving through the exercise. A program 12 is then built.

The program 12 is assembled comprising a presentation 13, preferably using POWERPOINT, and a lecture, the creative fine art exercise 14, and a final exercise summary and presentation of artwork 15.

At the exercise presentation 13, a POWERPOINT presentation introduces the creative process that will be involved in the ensuing exercise, and explains its foundation and attributes. It explains that the creative process involves risk taking, creativity, innovation and imagination. The presentation then describes the photographic creative process using examples of both black and white and color photography. Composition, design, use of light and contrast are all presented in the lecture. Photographs shown in the presentation discussed with the group to heighten awareness and sensitivity to the meaning of the artwork and the attributes of the artwork that allow it to communicate those attributes. This process opens up dialogue in the group, which will be needed during the exercise to communicate and share ideas. The full exercise is then introduced and described and examples are presented.

Each participant is provided with a camera with Black and White film and Color Print film.

Participants are divided into at least two teams each led by an instructor. The instructors carry a digital camera to assist in instruction and for participants to take pictures.

Participants are instructed in the use and uses of both digital and conventional cameras.

Each instructor shows their team the basic operations of the digital camera such as how to turn the digital camera on and off, viewing options, menu access, image control, exposure control, reviewing images, and the like.

As separate teams, participants are to discuss topics on communication and teamwork as stated in their packets. Examples of questions pertaining to communication and teamwork are as follows: What can be communicated through a photograph? What are some aspects of where we are right now and how would we communicate it through artwork? What is the difference between black and white and color and how can it be used? How can scale play a part in a photograph? How do you feel you can best help the team with its objectives? How can one use the creativity of the team to increase their creativity? How can one further the creativity of the team?

Each participant is given a packet that addresses different tips and topics of the documentation process. Additionally, they are given a list of images that they are to try to capture during the exercise.

Individually participants are to give a written answer to a set of questions stated in their packets. Examples of questions pertaining to documenting an environment are the following: What are elements that make up a strong composition? How can light be used in a photograph? How can angel of view be important and used? What is the difference between black and white and color and how can it be used? How can scale play a part in a photograph? What values can be communicated through a photograph? What do you want to communicate about this environment?

In the exercise 14, participants and instructors move through the environment to be documented and work with participants with discussions, examples, and tips on using the conventional and digital cameras. Instructors take images with the digital cameras and use these images as examples during instruction. Participants are also required to take at least one digital camera photograph.

After the first session the group takes a short break and then assembles for a one hour drawing and visioning session.

Instructors conduct a one hour "Art of seeing" session with the teams. Participants assemble in a location and are given sketchpads and pencils. They are encouraged to be sensitive to how the rest of their team members execute the exercise and learn from them. Participants begin sketching the environment using pencils to achieve certain goals. Examples of the goals are the following: Visually reacting to shape and value and translating that to the sketch paper. Keeping their drawing utensil continually moving. Drawing faster than they can think. Letting their subconscious senses take part in the eye to hand relationship of seeing and drawing.

Participants are then given watercolor pencils to add color to their existing sketches. They are to achieve certain goals. Examples of the goals are the following: React to the color they are seeing and describe it in their sketches. Work with warm colors and cool colors. Use color to separate objects and move the eye through the composition.

Participants are then given their last set of tools. Participants receive water and brushes to work the watercolor pencils into paints on the paper to achieve certain goals. Examples of the goals are the following: Use texture and contrast to describe objects. Continue to record what you see in your sketch. Define and interpret color to a higher level.

Presentation of individual drawings are done and final critiques are given by the instructors. Aspects of the process and experience are openly discussed between participants and the instructors. Individual as well as team achievements, sensitivity, process and risk-taking are addressed by the instructors.

During the sketching session instructors download images from the digital cameras into a laptop, for example, and image manipulation is executed by a staff member and put into a POWERPOINT presentation.

Participants take a break, for example for ten minutes.

During the break the instructors finalize the images on the laptops and prepare the POWERPOINT presentation with each team's images related to the categories. The instructors also fill their own categories, such as, for example, best use of light, best use of composition, and the like.

After the break the participants view a presentation of images captured earlier by instructors and participants. These are viewed on a presentation station of laptop, TV, projection system, or other display device.

The participants openly discuss the qualities, attributes and success of the images. Individual as well as team attributes are highlighted and discussed The participants then go back to their teams and begin the second image collecting sessions with their cameras.

At the end of the exercise participants return to a central location and individually return to their questions they had answered earlier and are given a chance to amend their first answer in a new column.

Each team member shares their respective answers, information, and experience. The group gives insight in how to improve their creative insight regarding documenting the environment Each team prepares a collaborative statement that reflects the previously stated topics, goals and objectives and of how the team as a whole feels these goals and objectives were achieved in the exercise through the processes of creative thinking, teamwork, leadership, communication, and thinking outside of the box.

A second POWERPOINT presentation 15, with the group's images and summary, is provided to the whole group. Images taken during the exercise are used in the presentation. In the middle of the presentation the group votes as a whole on the most successful images. The group answers questions regarding the process. A summary is then given in POWERPOINT in conclusion.

At the end of the exercise film is collected and the program sponsor has the film developed and prints made. Select images are identified for recognition and enlarged for display at a follow-up meeting and reception.

A follow-up party and critique session is scheduled. At the follow-up meeting, film is presented and critiqued. Images are printed or enlarged, and sketches are displayed for viewing. These finished pieces can then be displayed to be a reminder of the goals and objectives of the exercise. These programs are intended to encourage the broadening of creative thinking, innovation, communication, flexibility, teamwork and "thinking outside the box."

Numerous variations will occur to those skilled in the art in light of the foregoing disclosure. For example, while the illustrative embodiments preferably use a POWERPOINT generated presentation, any number of electronic presentation packages could be employed, such as other software packages in conjunction with computer equipment and monitors, film projectors, video presentations as well as non-electronic presentation formats, such as dry erase boards, flip charts, chalkboards and the like. While the illustrative examples employ photography, sketching and mobile building, any number of fine art media could be employed in the practice of the present invention, such as, for example, sculpting, painting, origami, metal casting, or any other fine art medium. These examples are merely illustrative, and not intended to be limiting in scope.

Having thus described the invention, what is claimed and desired to be secured by Letters Patent is:

1. A method of enhancing work related leadership, communication and creative skills comprising:
   the provision of a studio capable of providing a facility for implementing a project;
   communication between said studio and a sponsor, said sponsor approving said project based upon predetermined objectives;
   the provision of participants, said participants affiliated with said sponsor and said participants taking part in said project; and
   wherein said project comprises
      at least one presentation portion wherein the studio introduces to the participants a specific art medium or media to be employed for the project and objectives and goals to be achieved in the project while creating a completed tangible artwork,
      at least one exercise portion for the creation of the tangible artwork created by said participants assembled into at least two groups, each of said groups comprising at least three participants,
      at least one conclusion portion wherein said participants critique said artwork and provide answers to written questions provided by said studio;
   wherein said tangible artwork comprises a plurality of mobiles, the number of said plurality of mobiles corresponding to the number of said groups of said participants; and
   wherein a larger mobile is constructed from said plurality of mobiles.

2. The method of claim 1 wherein in said exercise each of said participants within each group have a discrete, predetermined function within said group for said exercise.

3. A method of enhancing work related leadership, communication and creative skills among participants comprising the steps of:
   assembling the participants into at least two groups comprising at least three participants;
   providing at least one presentation portion that introduces a specific art medium or media to be employed for the project and objectives and goals to be achieved in the project,
   providing at least one exercise portion for the creation of tangible artwork;
   providing at least one conclusion portion comprising an instructor's critique of the artwork produced, the participants' critique of the artwork produced byte participants, and a dialog among participants regarding the extent and manner that the goals and objectives were accomplished; and
   wherein said tangible artwork comprises a plurality of mobiles, the number of said plurality of mobiles corresponding to the number of said groups of said participants; and
   wherein a larger mobile is constructed from said plurality of mobiles.

4. The method of claim 3 wherein in said exercise each of said participants within each group have a discrete, predetermined function within said group for said exercise.

5. A method of enhancing work related leadership, communication and creative skills comprising:
   the provision of a studio capable of providing a facility for implementing a project;
   communication between the studio and a sponsor, the sponsor approving the project based upon predetermined objectives;
   the provision of participants, the participants affiliated with the sponsor and the participants taking part in the project;
   wherein the project comprises
      at least one presentation portion wherein the studio introduces to the participants a specific art medium or media to be employed for the project and objectives and goals to be achieved in the project while creating a completed tangible artwork,
      at least one exercise portion for the creation of tangible artwork created by the participants assembled into at least two groups, each of the groups comprising at least three participants,
      at least one conclusion portion wherein the participants critique the artwork and provide answers to written questions provided by the studio; and
   wherein in the exercise portion each of the participants within the group have a discrete, predetermined function within the group for generating the artwork; and
   wherein said tangible artwork comprises a plurality of mobiles, the number of said plurality of mobiles corresponding to the number of said groups of said participants: and
   wherein a larger mobile is constructed from said plurality of mobiles.

* * * * *

UNITED STATES PATENT AND TRADEMARK OFFICE
CERTIFICATE OF CORRECTION

PATENT NO. : 6,626,677 B2
DATED : September 30, 2003
INVENTOR(S) : Stuart H. Morse and Stacey A. Morse It is certified that error appears in the above-identified patent and that said Letters Patent is hereby corrected as shown below:

Column 14,
Line 17, replace "byte" with -- by the --
Line 52, replace "studio; and" with -- studio; --
Line 59, replace ": and" with -- ; and --

Signed and Sealed this

Second Day of December, 2003

JAMES E. ROGAN
*Director of the United States Patent and Trademark Office*